J. THOMPSON.
DUMPING WAGON.
APPLICATION FILED JAN. 19, 1920.
1,381,031.
Patented June 7, 1921.
3 SHEETS—SHEET 1.
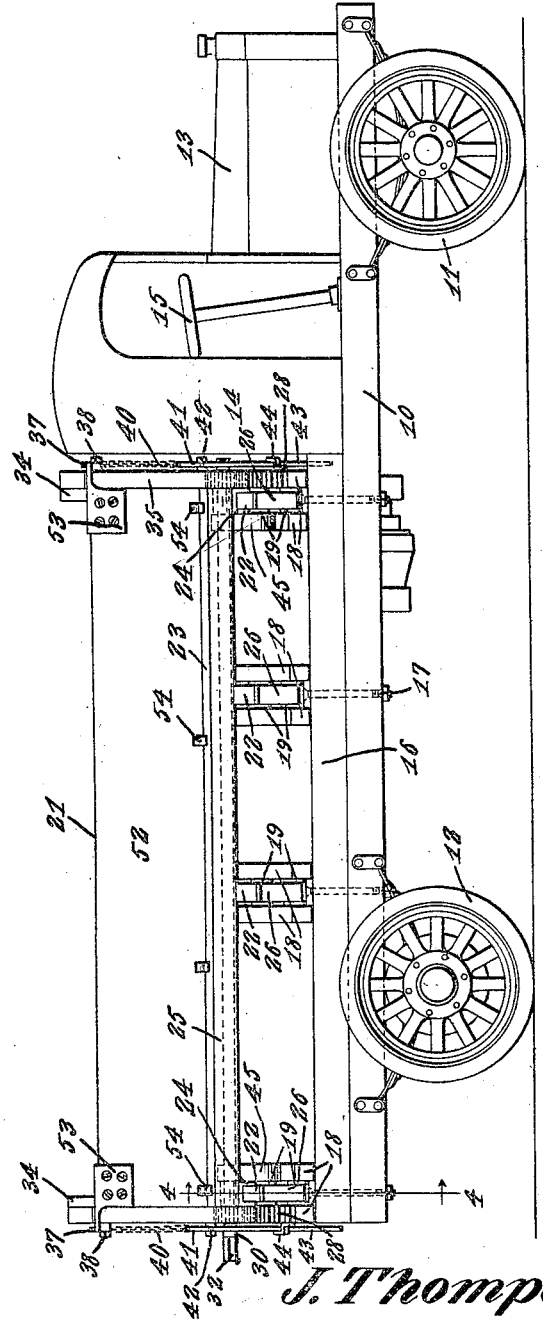
J. Thompson, Inventor
Witness
By C. A. Snow & Co.
Attorneys

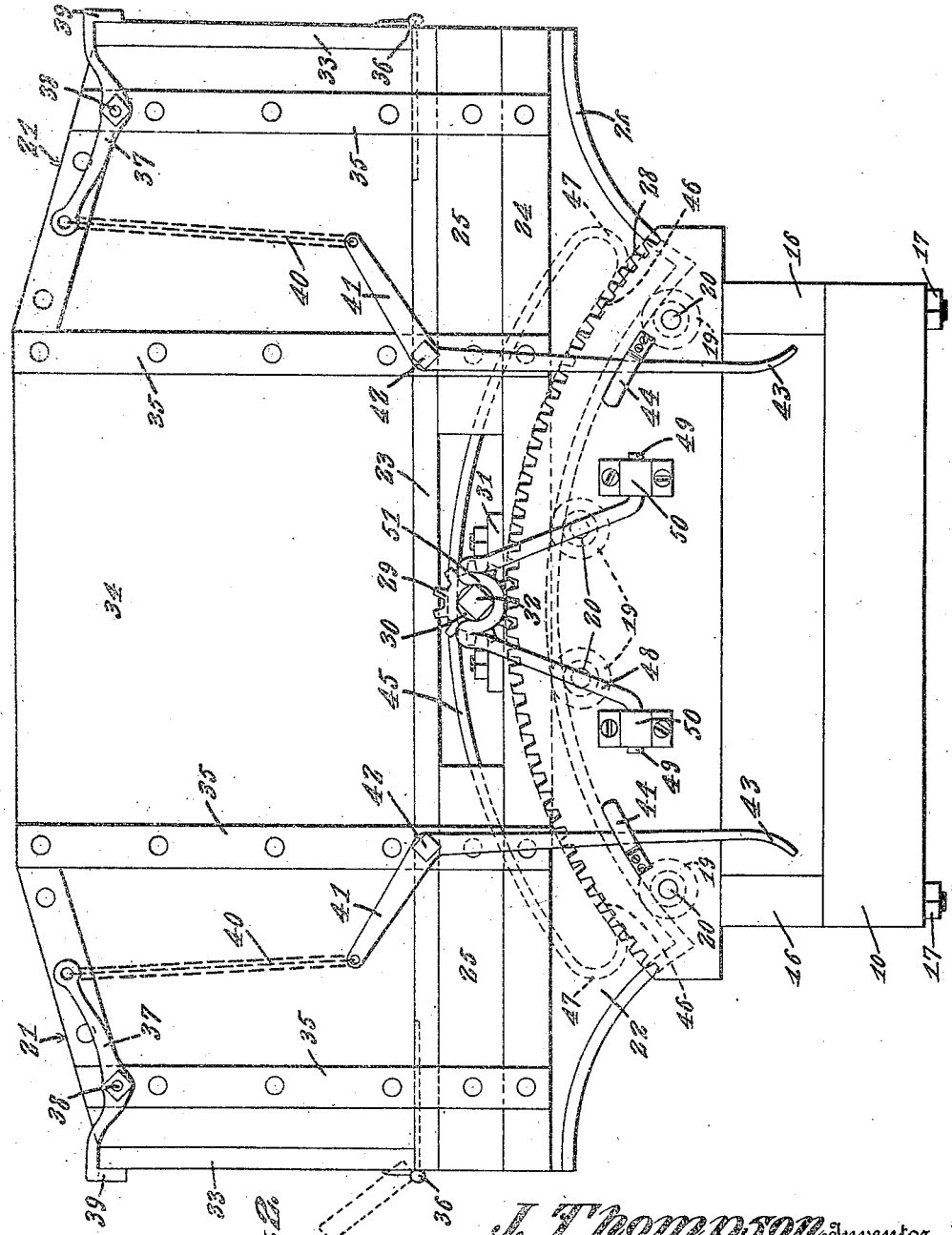

J. THOMPSON.
DUMPING WAGON.
APPLICATION FILED JAN. 19, 1920.
1,381,031.
Patented June 7, 1921.
3 SHEETS—SHEET 3.
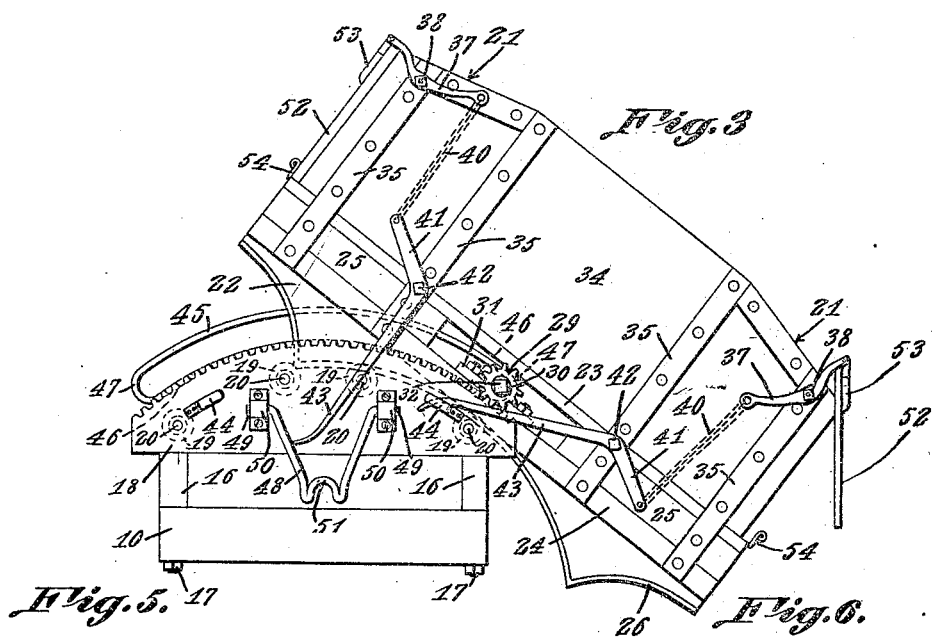
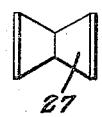
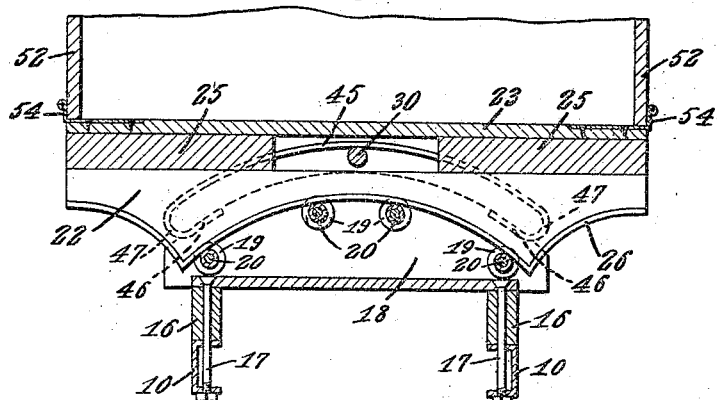
J. Thompson, Inventor
Witness

UNITED STATES PATENT OFFICE.

JAMES THOMPSON, OF GREELEY, COLORADO.

DUMPING-WAGON.

1,381,031. Specification of Letters Patent. Patented June 7, 1921.

Application filed January 19, 1920. Serial No. 352,281.

*To all whom it may concern:*

Be it known that I, JAMES THOMPSON, a citizen of the United States, residing at Greeley, in the county of Weld and State of Colorado, have invented a new and useful Dumping-Wagon, of which the following is a specification.

This invention relates to new and useful improvements in dumping wagons or trucks adapted for use on any kind of wheeled or other vehicles or trucks, and especially automobile or self-propelled vehicles, for dumping granular or similar material, such as beets, gravel, coal, sand or any material or things that can be handled in that way.

The object of the invention is to provide an improved dumping mechanism in which the body of the wagon or truck is adapted to move or tilt to one side or other, and which includes novel means for supporting and moving or tilting the body to either side, as well as to control and limit the movements thereof, to hold the body in a normal position and to provide side doors or gates adapted to be automatically released for discharging the load when the latter is dumped, said doors automatically moving or swinging to closed positions when the body of the truck or wagon is righted or moved to normal or carrying position.

With the above and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:

Figure 1 is a side elevation of a dumping wagon or truck constructed in accordance with the invention;

Fig. 2 is an end elevation of the device on an enlarged scale, the body and wheels of the truck being omitted;

Fig. 3 is a view similar to Fig. 2 on a reduced scale from that shown in Fig. 2 and showing the body in a dumping position;

Fig. 4 is a fragmentary vertical sectional view taken on the line 4—4 of Fig. 1 and looking in the direction indicated by the arrows;

Fig. 5 is a detailed view in elevation of a roller adapted to movably or tiltably support the body; and Fig. 6 is a similar view of a modified form of pulley.

Referring to the drawings in detail, in which like reference characters designate corresponding parts throughout the several views, the numeral 10 designates the frame or chassis of a wagon or automobile, an automobile or self-propelled vehicle being shown having the supporting and driving wheels 11 and 12, the former serving for steering purposes and the vehicle being propelled from the motor housed within the hood 13. The cab is designated at 14 and the steering wheel at 15.

In the adaptation of the invention, there is mounted on the frame or chassis 10, the side or longitudinal bed pieces 16 suitably bolted or otherwise secured in position as shown at 17. Mounted on these side pieces at suitably spaced points, preferably adjacent the front and rear ends and at intermediate points, are segmental supports 18 which are disposed in spaced pairs with their rectilinear lower edges constituting chords of the arcs and resting on and secured to the bed pieces 16. The segmental supports or blocks 18 constitute bolsters disposed transversely. Journaled between the spaced pairs of supports are antifriction rollers 19 rotatably mounted on the bolts or the like 20 connecting the spaced pairs of supports as more particularly indicated in Fig. 4 of the drawings.

The rollers 19 are designed to movably support the body 21. This body is provided with a series of similarly spaced depending extensions or segments 22 secured to transverse steel angle or channel members 24, and to spaced longitudinal stringers 25 extending throughout the length of the body. These stringers are directly connected to the bottom 23 of the body and to the transverse members 24 so as to provide intervening spaces adapted to accommodate parts of the mechanism by which the body may be tilted to dump at either side. The bottom edges of the extensions or segments 22 are reinforced with metallic strips 26 for the purpose of preventing indentation due to the weight of the load being supported on the rollers. Said strips are either flat so as to coact with rollers 19 in the form of cylinders, or of angular formation so as to coact with rollers 27 shown in Fig. 6, and which are provided with a substantially V-shaped groove in the periphery of each. In either case, the pulleys will tend to prevent longitudinal shifting of the body.

In order to actuate the body to move the same toward and away from the dumping and carrying positions, the end segments 18 are provided on their curved upper edges with ratchet teeth 28 forming arcuate or segmental racks which are designed to coöperate with pinions 29 fixed to a shaft 30 extending longitudinally throughout the length of the body between the bottom portion 23, the stringers 25, and the transverse members 24. This shaft is journaled in bearings 31 secured on top of the metallic transverse members 24. The projecting ends of the shaft are squared as indicated at 32 for the application of a crank handle or the like by which the shaft may be rotated or turned, which owing to the pinions 29 being in mesh with the rack teeth will result in the pinions rolling on the latter uniformly at each end of the body. As the shaft is journaled on the body, the body will be shifted laterally in an arcuate path, one side of the body sliding or moving outwardly and downwardly and the other side moving inwardly and upwardly.

The sides of the body are provided with gates 33 which are mounted to swing between the end portions or boards 34. These end boards are held in position by spaced stakes 35 anchored to the bottom structure. As shown Fig. 2, hinges 36 are provided along the bottom of the body and secured to the lower edges of the side gates so that the latter may swing outwardly and downwardly. An automatic latch or lift device is provided in conjunction with said side gates and includes levers 37 pivoted at 38 to the outer stakes 35 preferably nearer the outer ends of the levers than the inner ends. The outer ends of the levers are provided with depending portions or hooks 39 adapted to engage over the upper edges of the sides to retain the latter in closed position. The inner ends of the levers are preferably connected by chains or like flexible connections 40 with the upwardly extending arms of angle levers 41 pivoted at 42 to the inner stakes. The other arms of these levers extend downwardly and taper toward their free ends which are preferably curved or bent outwardly as indicated at 43. These arms operate beneath keepers or straps 44 which are secured at their outer ends to the exposed faces of the toothed end segments. The spaces between the straps and the faces of the segments are open at the inner ends to facilitate application of the levers. Thus as the body tilts in either direction, the lever 41 at the delivery side is restrained from displacement beneath the strap and is swung on its pivot. This will cause the lower arm to swing to a horizontal position and the short arm to swing downwardly, thus pulling downwardly on the connection 40 to rock the attached lever 37 on its pivot and raise the depending portion or hook 39 above the side gate. The gate will thus be released to swing downwardly and permit the discharge of the load. As the straps are not fastened at their inner ends the levers on the upwardly moving side of the body will move out of engagement with the straps during the dumping operation so that the gate at that side remains closed. When the body is moved the other way, the opposite action takes place. In order to limit the movements of the body accurately in either direction guards 45 are provided on certain of the segments and preferably comprise strips or slotted members anchored to the second segment from each end so as to be hidden from view except when the body is dumped. As shown, the strips forming the guards are of arcuate formation concentric to the segments and racks and have their extremities turned inwardly and anchored as indicated at 46. The bight portions 47 at the bends of the strips engage the shaft 30 so as to accurately regulate and limit the sliding arcuate movement or tilting of the body in either direction. The shaft operates between the top portions of the guards and the top portions of the segments or in the slots so as to assist the weight of the body in retaining the latter in position.

In order to hold the body in a central or carrying position a clamp 48 is provided, the same comprising a substantially inverted V-shaped member having outturned extremities 49 pivoted in bearings 50 so that they may swing down and out of the way when the body is to be dumped so as to permit movement of the body. When the clamps are raised the restricted upper or bight portions of the clamps which are provided with reëntrant portions 51 in the form of upwardly opening recesses engage the shaft as clearly shown in Fig. 2 of the drawings, thus preventing movement of the body to either side and holding it in the center. The tilting action can be effectively regulated by the length and depth of the segments and racks or the lengths of the guards employed in connection therewith.

In addition to the method of automatic release of the sides as above explained, this construction may be as shown in Figs. 1, 3 and 4, in which the levers 37 are connected hingedly to the outwardly swinging sides or side gates 52 as through the medium of down turned attached portions or plates 53, the hooks or keepers 54 being rigid instead of hinged as are the portions 36. In this manner, when the levers 37 are swung on their pivots 38, the sides will be lifted upwardly as the body is tilted, in the manner clearly shown in Fig. 3 of the drawings, and will swing freely. The parts will of course return to normal positions when the shaft is turned in the opposite direction to right the body.

The bed or body will be under the complete control of the operator at all times and can be dumped slowly and without jar or allowed to have some momentum if desirable, some materials owing to their nature, requiring a slight jar to discharge them.

It will be seen that I have provided a very simple and desirable dumping vehicle for general purposes which can be readily applied to any chassis or wagon frame and which can be conveniently manipulated.

Having thus described the invention what I claim is:

1. A dumping body attachment for vehicles, including longitudinal bed pieces, transverse segmental supports mounted thereon, guard straps connected to the supports and forming arcuate slots, antifriction rollers between the supports, a body, depending extensions on the body and extending transversely thereof, said extensions having arcuate recesses in the lower portions thereof and bearing on the antifriction rollers, a longitudinal shaft carried by the body and extending through the arcuate slots, gears thereon, rack teeth upon the segmental supports and engaged by the gears, means for rotating the shaft and gears to swing the body laterally to dumping position, a hingedly mounted yoke carried by one of the supports and movable into engagement with the shaft to hold the body against lateral movement.

2. A dumping body attachment for vehicles, including longitudinal bed pieces, transverse segmental supports mounted thereon, guard straps connected to the supports and forming arcuate slots, antifriction rollers between the supports, a body, depending extensions on the body and extending transversely thereof, said extensions having arcuate recesses in the lower portions thereof and bearing on the antifriction rollers, a longitudinal shaft carried by the body and extending through the arcuate slots, gears thereon, rack teeth upon the segmental supports and engaged by the gears, means for rotating the shaft and gears to swing the body laterally to dumping position, side gates hingedly connected to the body, levers for controlling the movement of the gates relative to the body, actuating levers fulcrumed on the body and connected to the first named levers, and means operated by the movement of the body to dumping position for shifting the actuating levers out of normal position.

3. A dump body attachment for vehicles including transverse arcuate supports, connections therebetween for attachment to the chassis of a vehicle, an arcuate series of ratchet teeth carried by one of the supports, antifriction bearings connected to the supports, a body, transversely extending depending extensions upon the body having arcuate recesses for receiving the antifriction bearings, a shaft journaled on the body, a gear carried thereby and meshing with the ratchet teeth, means movably connected to one of the supports for engaging the shaft to hold the body normally in central position, side gates hingedly connected to the body, levers fulcrumed on the body for controlling the opening and closing of the gates, opposed operating levers, connections between the operating levers and the first named levers, and keepers upon one of the arcuate supports for sliding engagement by the operating levers, and means for rotating the shaft to swing and dump the body laterally thereby moving one of the operating levers away from its keeper and swinging the other operating lever upon its keeper.

In testimony that I claim the foregoing as my own, I have hereto affixed my signature in the presence of two witnesses.

JAMES THOMPSON.

Witnesses:
HENRY CANDLIN,
CHARLES D. TODD.